United States Patent Office 3,109,519
Patented Nov. 5, 1963

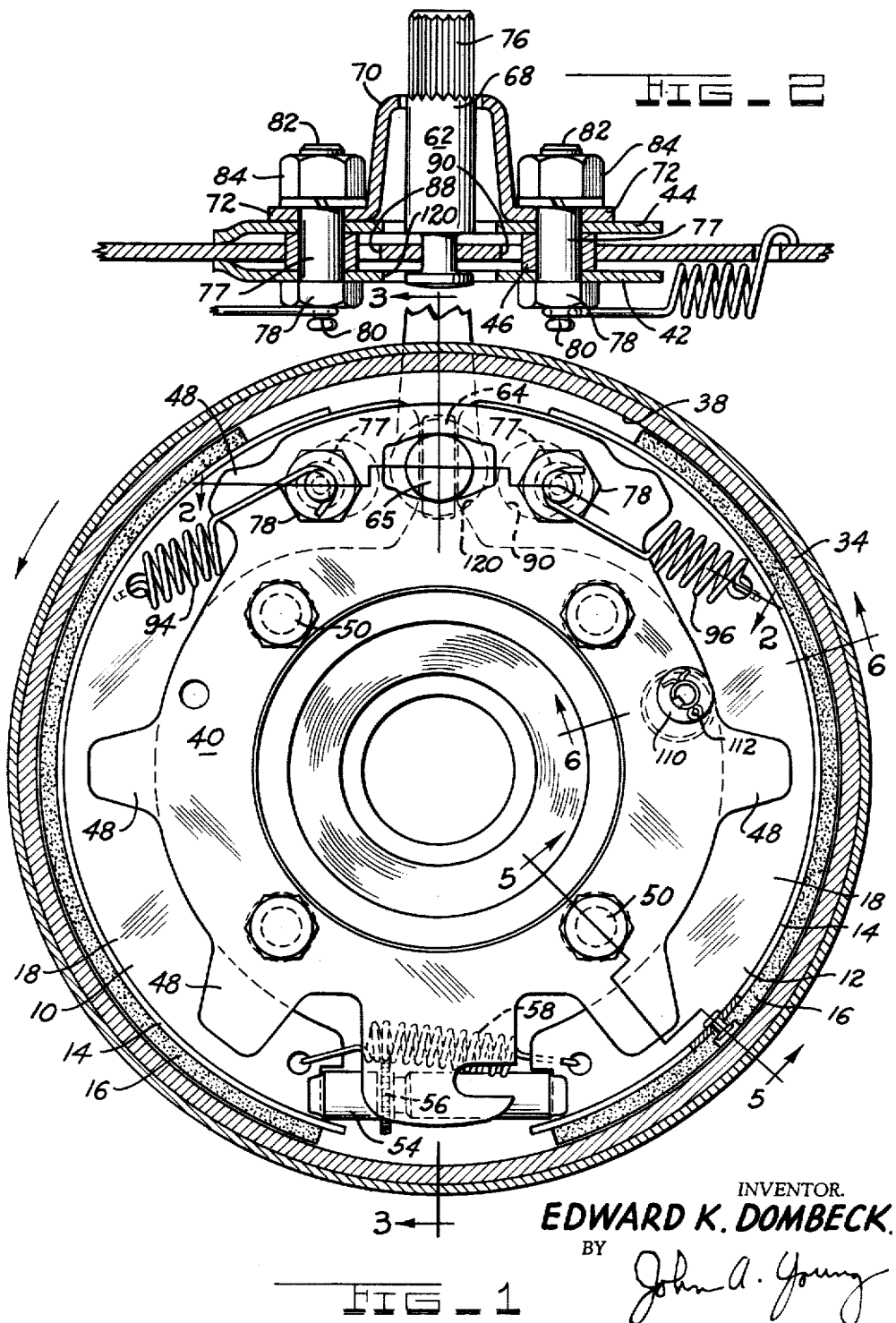

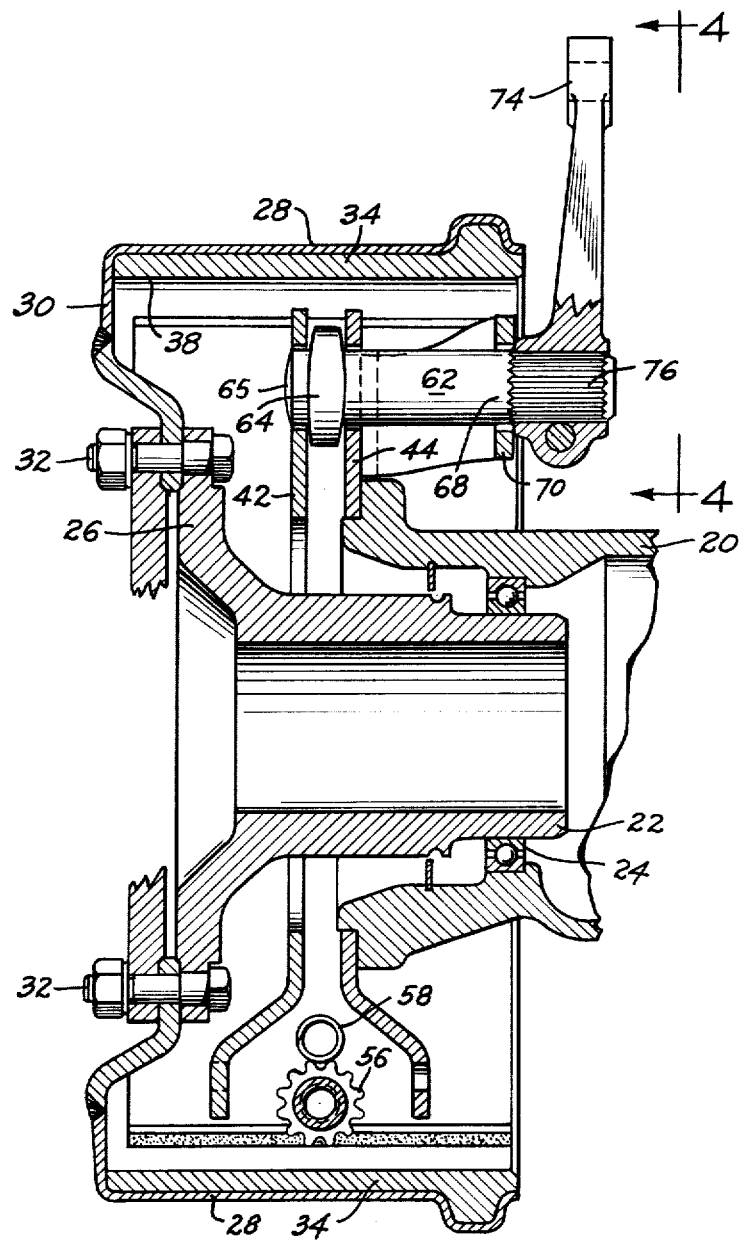
FIG_3
INVENTOR.
EDWARD K. DOMBECK.
BY John A. Young
ATTORNEY.

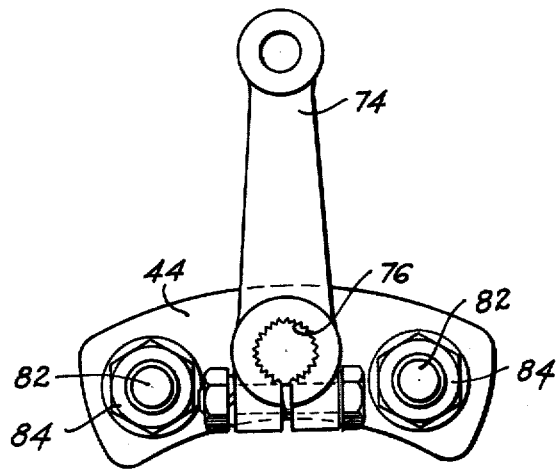
FIG_4
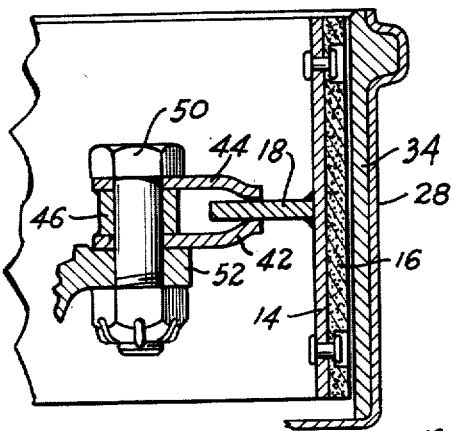
FIG_5
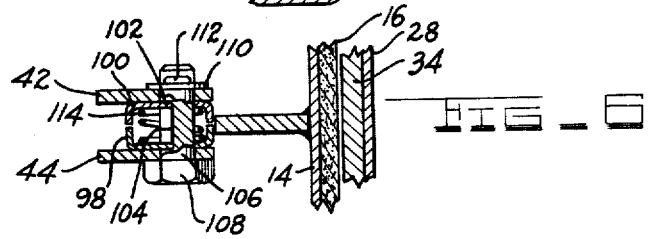
FIG_6
INVENTOR.
EDWARD K. DOMBECK.
BY John A. Young
ATTORNEY.

3,109,519
CAM SHAFT ACTUATED INTERNALLY
EXPANDING BRAKE
Edward K. Dombeck, South Bend, Ind., assignor to The
Bendix Corporation, a corporation of Delaware
Filed Apr. 13, 1960, Ser. No. 22,018
1 Claim. (Cl. 188—78)

This invention relates to brakes and particularly to brakes of the shoe type construction which are engageable with an opposed cylindrical drum surface to provide a braking action thereon.

One of the objects of the present invention is to provide a mechanically actuated shoe type brake which is of sufficiently compact construction that it can be incorporated within the transmission case of a vehicle and will yet be capable of developing sufficient torque for controlling vehicle movement.

A further object of the invention is to provide a novel actuating means which is supported by a journalling structure fastened to the brake by anchoring means. In this manner, the anchoring means are constructed to perform a plurality of assembling functions and as a result the brake is compact in size and economical to manufacture.

Another object of the invention is to provide a more efficient distribution of the anchoring forces of the shoes to reduce stress concentrations and hence the brake has higher torque capacity than previous brakes.

A further object of the invention is to provide novel positioning means for the brake shoes by which the shoe can be located concentrically with the drum and adjusted to compensate for lining wear, with minimum difficulty.

Other objects and features of the present invention will become apparent from consideration of the following description which proceeds with reference to the accompanying drawings wherein:

FIGURE 1 is a side elevation view of a brake with the drum being shown in section view;

FIGURES 2, 3 are sectional views taken on the respective section lines 2—2 and 3—3 of FIGURE 1;

FIGURE 4 is a detail view of the actuating mechanism, looking in the direction indicated by the arrows 4—4 in FIGURE 3; and FIGURES 5 and 6 are sectional views taken on section lines 5—5 and 6—6 of FIGURE 1.

Referring now to the drawings, the brake consists of two brake shoes 10 and 12, each including a rim 14 with friction material lining 16 and a web 18 which serves to strengthen the shoe against bending. The brake is mounted at the transmission case of the vehicle by means of a bracket 20 (FIGURE 3). The rotatable portion of the brake includes a shaft 22 which is journalled on a bearing 24 and has the usual flange 26 for carrying a drum 28. The drum back 30 is secured to flange 26 by means of bolts 32 or the like and the drum ring 34 provides the usual cylindrical braking surface 38.

The two brake shoes 10 and 12 are carried by a backing plate or spider 40 which is composed of two plates 42 and 44 which may be manufactured as stampings (pressings as they are sometimes referred to), these two stamped plates 42, 44 being laterally held apart by spacers 46 which are welded to the respective plates. Each plate has radially extending projections forming guide arms 48, three such guide arms being provided for each brake shoe at the opposite sides of their webs 18. In this manner the shoes are located properly in a lateral sense for radial movement against the circumferential surface 38 of the drum. The projections 48 are spaced sufficiently apart to receive the shoe web therebetween as shown in FIGURE 5 and permit radial movement of the shoes but limit their axial movement. The two plates are fastened together by means of bolts 50 which pass through aligned openings of plates 42 and 44 and also through an opening in the spacers 46 and flange 52 of the bracket 20.

The two brake shoes are connected at one pair of their adjacent shoe ends by means of an adjustable strut 54 or link which is extendible by turning the star wheel 56 in order to compensate for wear of the lining material 16 on the shoe rims. The star wheel 56 is held against accidental rotation by means of a spring 58 which is stretched between the two shoe ends to hold them against the strut 54 and bears against the star wheel 56 to prevent its rotation except during adjustment. The other pair of adjacent shoe ends are mechanically spread apart during brake actuation by means of a cam shaft 62 having a cam 64 bearing directly against the ends of the shoes, the cam shaft being journalled at end 5 in the plate 42 (FIGURE 3) and at end 68 by a strap 70 which extends laterally from the support plate toward the open end of the drum. The strap 70 is mounted by two transverse flanges 72.

The cam shaft 62 is rotated by a lever arm 74 which has a splined connection 76 with cam shaft 62 as shown in FIGURE 3. Also at the actuated ends of the shoes, are two anchor bolts 77 which pass through openings in the plates 42 and 44 respectively and likewise through openings in spacer 46 and flange 72 of strap 70. The one end of the anchor bolt has a boss 78 and neck 80 and its opposite end 82 is threaded to receive a nut 84 so that the strap, the plates 42, 44 and spacer 46 are jointly fastened together by the anchor. Openings 88 and 90 of brake shoes 10 and 12 which pass over the spacers on the anchors, are oblong so that either shoe end can move outwardly in a brake applying direction but is limited in its return movement so that both shoes can anchor together on one or the other of the anchors 77 depending on the direction of drum rotation.

To maintain the shoes in a normally released position, return springs 94 and 96 are passed through openings in the brake shoes and are then stretched to connect with the necks 80 of the anchors and thereby urging the shoes retractively until the openings 88 and 90 are bottomed against the spacers 46 held by the anchors 77.

When the brake is mounted vertically as shown in FIGURE 1, the weight of the brake shoes is carried by the anchors 77 but in some instances, it is convenient to mount the brake 90 degrees counterclockwise from the position shown in FIGURE 1 in which case suitable provision must be made for vertical support of the two brake shoes so that they will not engage the drum surface under their own weight. In the present invention, a simplified shoe supporting means is provided as shown in FIGURES 1 and 6, in the form of two dish-shaped stampings 98 and 100, each of which has a tongue 102 received within a groove 104 of stem 106. The stem has an enlarged head 108 with irregularly shaped sides which will facilitate gripping and turning by means of a tool, and the stem is passed through and is journalled in aligned openings in the two plates 42 and 44. A washer 110 and cotter pin may be used to hold the stem 106 against removal. Between each of the two dish-shaped stampings is a compressed spring 114 which forces the two dished stampings 98 and 100 apart so that they frictionally engage their opposed surfaces of plates 42 and 44 and thereby resist turning movement. The outer periphery of the dished stampings is eccentrically shaped as can be clearly seen in FIGURE 1 and bears against the inner edge of the web 18 of shoe 12. By turning the pin 106 at its end 108 it is possible to bias the shoe 18 outwardly and determines its radial location by means of the eccentric surfaces in contact with the shoe web. Since the dished stampings resist turning movement by their frictional engagement with plates 42 and 44, they are capable of carrying the combined load of the brake shoes and structure connected thereto and maintain radial support for the shoes when the brake is mounted vertically 90 degrees counterclockwise from the position shown in FIGURE 1. There is thereby provided a simple and inexpensive and readily adjustable means for support of the brake shoes.

In operation, assuming that the drum is rotating in a counterclockwise direction as indicated by the arrow in FIGURE 1 braking operation is initiated by pulling lever 74 through a cable or operating rod (not shown) and thereby rotating the cam shaft 62 on its journal support strap 70. Cam 64 forces the ends of the shoes 10 and 12 apart and shoe 10, acting as a primary shoe, engages the cylindrical surface 38 and the wiping action of the lining 16 against the surface 38 develops a thrust through strut 54 to apply the shoe 12. Both shoes then anchor as a unit on anchor 77 of shoe 12. Since the anchor 77 is held at its opposite ends by means of the plates 42 and 44 a portion of the anchoring load is transmitted through plate 42 to the anchor 77 combined with shoe 10 and this distribution of the anchoring load over two anchoring means provides greater torque capacity of the brake with smaller structural members. Conversely, with the same size structural members, greater anchoring loads can be sustained with the same size anchors previously used.

The clearance between the camshaft 62 and its opening on strap 70 is sufficient to allow the camshaft to rock thereabout. To accommodate for radial movement of the shoes the camshaft 62 rocks about its opening on strap 70 and end 65 moves tangentially of the brake within an oversize opening 120 (FIGURE 2) of plate 42. The opening 120 (FIGURES 1, 2 and 3) is formed oblong with its edges in snug contact with the camshaft end 65 at its upper and lower edges in order to prevent radial movement, but tangential clearance allows the slight necessary angular movement of the camshaft to follow up of the shoes. Also, the edges of the cam 64 are rounded as shown in FIGURES 2 and 3 to allow for the described angular movement of the cam shaft.

When the brake is released return springs 94 and 96 draw the actuated shoe ends together until the openings 88 and 90 bottom on spacers 46 held by anchors 77 thereby releasing engagement of the lining 16 with the drum. The return movement of the shoes also rotates the cam 64 in a brake releasing direction.

During braking in opposite drum rotation (clockwise shown in FIG. 1) brake shoe 12 serves as the primary shoe and brake shoe 10 as the secondary shoe, the brake shoe 12 being moved radially outwardly by the cam 64 as provided by the oversize opening 90 and both shoes anchor together at the end of shoe 10 on its anchor 77. When the brake is released, the shoes are retracted by return springs 94 and 96 in the same manner previously described.

When the brake is mounted 90 degrees counterclockwise from the position shown in FIG. 1, and a brake adjustment is required, the vertical position of the shoes is adjusted, by simply rotating the stem 106 with a tool and this rotates the cup shaped members 98 and 100 bringing their eccentric outer peripheries to some preferred point of engagement between shoe 12 to vertically support the shoes in their proper vertical position.

Although only one embodiment of the invention has been selected for description, it will be understood that this is only illustrative of the invention and is in no sense restrictive thereof. It is reasonably to be expected, that those skilled in the art, can make numerous revisions and adaptations of the invention as suit particular design requirements, and it is intended therefore that such revisions and adaptations as embody the principles of the herein disclosed invention, will be included within the scope of the following claim as equivalents thereof.

What is claimed is:

In a brake, a support member, a pair of brake shoes arranged in end to end relation, anchoring means mounted on said support member for said brake shoes, actuating means comprising a shaft having a cam thereon disposed between an adjacent pair of ends of said brake shoes for engaging the same, said support member comprising two axially spaced plates, spacer means for said plates located between said plates and rigidly attached thereto, each of said shoes having a web slidably mounted between the opposed faces of said plates, a bearing member attached to and projecting from the other face of one of said plates and rigidly connected thereto, said bearing member comprising a plate extending in a direction transverse to said shaft and spaced from said other face of said one plate, three axially spaced openings one in said bearing member plate and one in each of said support plates, said shaft extending through said openings, said bearing member opening edge being contiguous a peripheral portion of said shaft, the edge of each said support plate openings and said shaft being so constructed that said shaft will bear thereon during actuation of said brake, said bearing member plate and said support plates constituting the sole bearing support for said shaft, and lever means operatively connected to said shaft for turning the same and thereby actuate said brake shoes.

References Cited in the file of this patent

UNITED STATES PATENTS

| | | |
|---|---|---|
| 1,792,432 | Lauer | Feb. 10, 1931 |
| 2,475,491 | Goepfrich et al. | July 5, 1949 |
| 2,728,418 | Dombeck | Dec. 27, 1955 |
| 2,920,723 | Sinclair | Jan. 12, 1960 |

FOREIGN PATENTS

| | | |
|---|---|---|
| 846,207 | Germany | Aug. 11, 1952 |
| 657,117 | Great Britain | Sept. 12, 1951 |
| 681,762 | Great Britain | Oct. 29, 1952 |

UNITED STATES PATENT OFFICE
CERTIFICATE OF CORRECTION

Patent No. 3,109,519            November 5, 1963

Edward K. Dombeck

It is hereby certified that error appears in the above numbered patent requiring correction and that the said Letters Patent should read as corrected below.

Column 2, line 15, for "5" read -- 65 --; column 3, line 36, after "up" insert -- movement --.

Signed and sealed this 9th day of June 1964.

(SEAL)
Attest:

ERNEST W. SWIDER
Attesting Officer

EDWARD J. BRENNER
Commissioner of Patents